Figure 3:
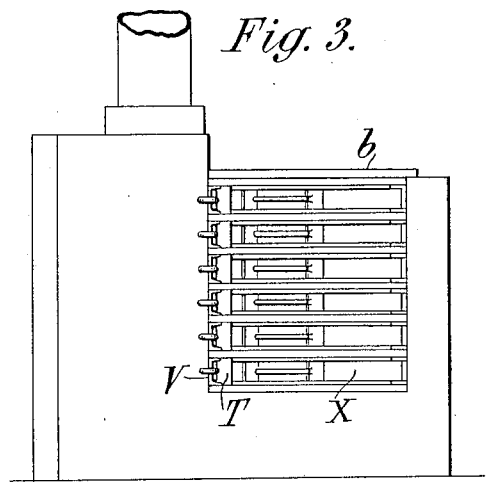

R. T. WALES.
APPARATUS FOR ROASTING SLIMES.
APPLICATION FILED DEC. 5, 1912.
1,085,831.
Patented Feb. 3, 1914.
2 SHEETS—SHEET 1.
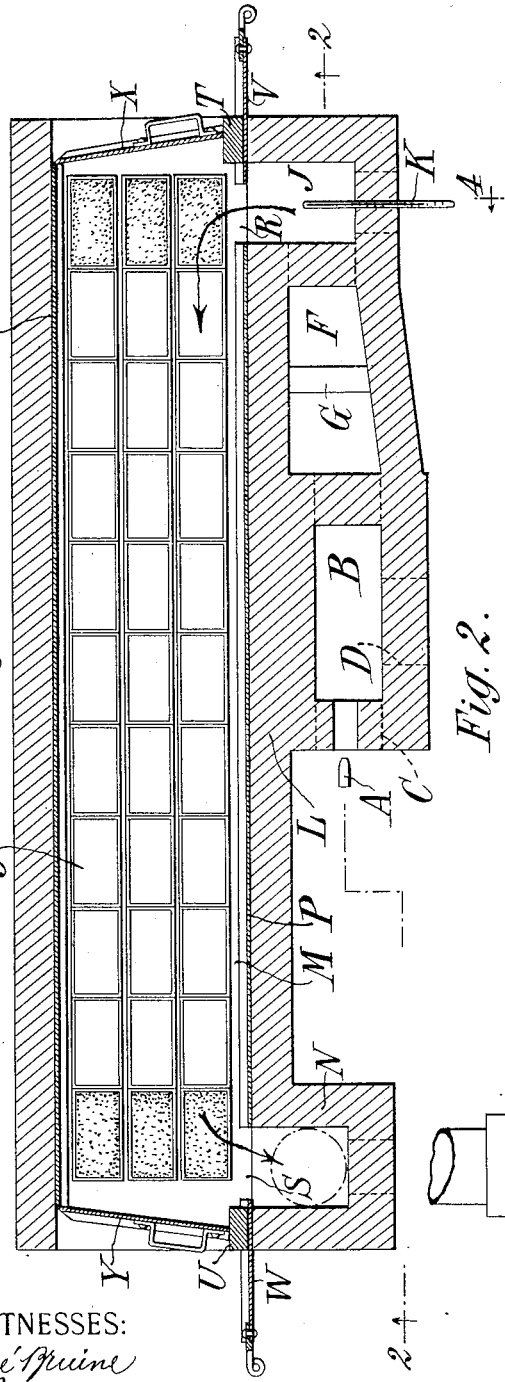
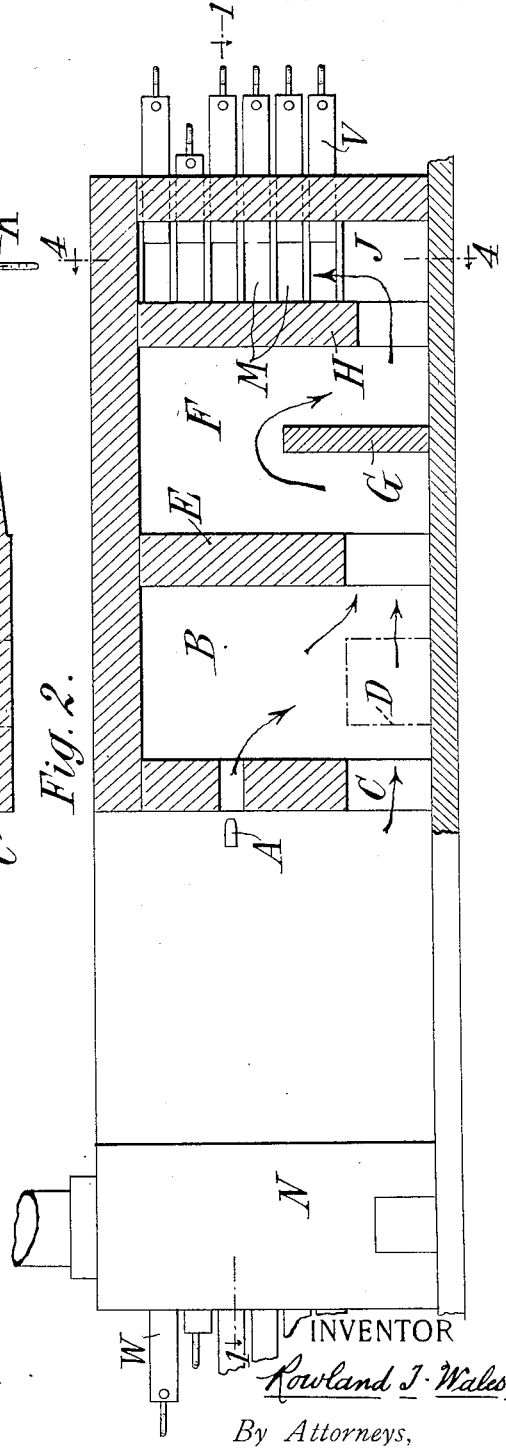
WITNESSES:
René Bruine
Fred White
INVENTOR
Rowland T. Wales,
By Attorneys,

R. T. WALES.
APPARATUS FOR ROASTING SLIMES.
APPLICATION FILED DEC. 5, 1912.

1,085,831.

Patented Feb. 3, 1914.

2 SHEETS—SHEET 2.

WITNESSES:
René Bruine
Fred White

INVENTOR:
Rowland T. Wales,
By Attorneys,
Fraser, Durk & Myers

UNITED STATES PATENT OFFICE.

ROWLAND T. WALES, OF CHROME, NEW JERSEY.

APPARATUS FOR ROASTING SLIMES.

1,085,831.  Specification of Letters Patent.  Patented Feb. 3, 1914.

Application filed December 5, 1912.  Serial No. 735,071.

*To all whom it may concern:*

Be it known that I, ROWLAND T. WALES, a citizen of the United States, residing at Chrome, in the county of Middlesex and State of New Jersey, have invented certain new and useful Improvements in Apparatus for Roasting Slimes, of which the following is a specification.

The slimes or mud which is a residue from the electrolytic copper process generally contains gold and silver and is treated by a smelting process to recover the precious metals. For the latter operation it is desirable to extract the copper as far as possible from the slimes. Much of the copper is in the form of the soluble sulfate which is readily extracted by simply washing. Some of the copper, however, is in sulfid or other insoluble forms and it is common to use sulfuric acid for extracting it. For this treatment with sulfuric acid it is important that a liberal supply of oxygen-bearing material be provided. This is secured by roasting the slimes before the treatment with sulfuric acid. Whether the roasting oxidizes the copper (and generally nickel) present or provides the oxygen in some other form, it is certain that the roasting increases the efficiency of the next step, the treatment with sulfuric acid.

According to the present invention I provide an advantageous apparatus and method for accomplishing the roasting of such slimes and similar materials.

After the slimes from the electrolytic copper plant have been washed with water and the soluble copper sulfate thus removed, the residue is pressed in a filter press. The resulting material, containing roughly 25% of water, is granulated and placed in shallow trays which are put through a roasting furnace of a specially suitable type. In these furnaces the slimes are submitted to large volumes of air at a moderate roasting temperature (600° F. in practice). The roasting carried out at such a low temperature is effected without sintering or forming hard lumps in the product, so that it comes out of the furnace in a form which makes the subsequent leaching with a mixture of boiling water and sulfuric acid most easy and efficient. The low temperature also permits the use of metal plates in the construction of the heating chambers and adjacent parts without involving any substantial warping of the metal, such as would occur at high temperatures.

The granulation of the slimes before introducing them into the furnace allows a rapid escape of moisture and the easy subsequent penetration of air or oxygen into the mass.

The use of trays avoids the necessity of any stirring or disturbance of the separate particles while the slimes are in the furnace or are being discharged, facilitates handling of the slimes into and out of the furnace and, by its division of the mass in the roasting chamber into a number of small sections, permits a complete roasting of each trayful of slimes by examining it before withdrawing it. The greatest advantage of this method of handling, however, is in avoiding the stirring of the mass, which stirring would shake up the valuable dust and cause it to go through the exit flues into the stack.

The apparatus illustrated is especially adapted for the carrying out of this process.

Figure 5:
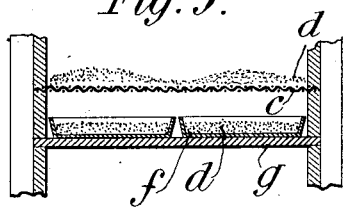
Figure 4:
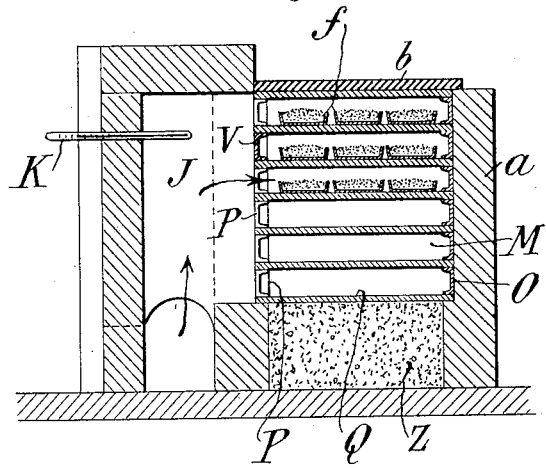

Figure 1 is a horizontal section on the line 1—1 of Fig. 2. Fig. 2 is a vertical longitudinal section on the line 2—2 of Fig. 1. Fig. 3 is an end elevation. Fig. 4 is a vertical transverse section on the line 4—4 of Fig. 2. Fig. 5 is a vertical section of a screen for granulating the slimes from the filter press and before introduction into the furnace.

Referring to the specific style of furnace illustrated, an oil burner A opens into combustion chamber B which constitutes a source of heat. In addition to the opening immediately in line with the burner A there are provided air openings C and D into the chamber B. The chamber B is made of brick-work and the openings C and D are made by merely withdrawing a few bricks, and they can be adjusted with sufficient accuracy by placing one or more bricks in the opening to restrict the passage of air. The air and flame gases then pass together under the arch of a wall E into a mixing chamber F where they pass over a baffle G and thence under the arch of a second wall H into a chamber J which serves as a distributing flue and leads directly to the roasting chambers. Through the chamber J we have passing a large volume of air heated to the proper temperature. In the upper part of this chamber is located a thermometer indicated typically at K for determining the temperature of the air. This is usually a recording thermometer and the temperature in practice is usually maintained at 600° F. as above stated. It is essential to provide a considerable volume of air and this can be regulated by the size of the openings C and D. The desired temperatures may be secured by adjusting the volume of the flame.

Alongside the inner wall of the brick structure which forms a combustion and mixing chamber, is a series of roasting chambers M into which the roasting gases from the chamber J are admitted and through which these gases pass to a discharge flue or stack N. As shown best in the sectional view, Fig. 4, there are six of these chambers M located one above another, the series of chambers being built up of channels O on the outer side and P on the inner side, with steel plates Q between. The outer channels O run the full length of the furnace while the inner channels P stop a little short of each end, so as to leave an admission opening R for the roasting gases at one end and an exit S for the same at the opposite end. At the extreme ends of the inner walls of the several compartments are arranged blocks T and U which support the ends of the plates Q beyond the ends of the channels P, one for the admission end and one for the exit end of each of the compartments. Independent flue gates or dampers V and W, at the ends of the compartments, slide in and out to close and open the passages R and S. Each chamber is provided also with doors X and Y at its opposite ends consisting of loose plates fitting freely in the space provided between the horizontal plates Q and adapted to be entirely removed or to be easily shoved in place to close the chamber with the necessary tightness. The lowermost metal plate Q is laid on a foundation Z of ashes or similar non-conducting material and the metal work is surrounded by a masonry wall $a$ at the back so as to avoid excessive loss of heat by radiation. A light cover $b$ of non-conducting material is laid on the top plate Q for the same purpose.

Before introducing them into the furnace the slimes from which most of the water has been expressed, are granulated. For example, in my practice they are placed upon a screen or grating $c$ (Fig. 5), the slimes being indicated at $d$, and are forced through the screen so that they fall into shallow trays or pans $f$ resting on a shelf $g$ below the screen. These trays are then placed in the furnace and the slimes roasted as described.

The furnace may be used in various ways depending on the time available and the character of the material.

Ordinarily the operation is as follows:—
The roasting chamber M which is to be used will be first cut off from the flues, and the other chambers in common, by closing its dampers V and W. The doors X and Y of this chamber will then be opened and the material introduced in trays $f$. When the chamber is full of trays placed in position the doors will be shut and the flues opened. The trays nearest the admission flue R will have their slimes completely roasted first. From time to time the door X will be withdrawn sufficiently to observe whether or not the roasting in these trays has proceeded sufficiently far. When this is the case the flues will be closed again, the doors opened, the trays nearest the admission flue (or such of them as are completely roasted) withdrawn and other trays introduced through the door Y, those previously in the chamber being shoved along to make room for the new ones. The same operation is carried on in the other compartments simultaneously. When working at less than full capacity the operator may carry only a few pans in each of the compartments, or he may concentrate the work all in one compartment by closing the flues of the others. The construction and method of use described permit of maintaining the fire and the volume of hot air always at proper adjustment and avoid delays from otherwise cooling down the furnace. They also keep down the quantity of poisonous fumes which might escape while withdrawing the roasted product, as well as permitting of examination of each individual tray before discharging, or the return of the tray to the furnace if it should be found not sufficiently roasted. The product can be secured of the greatest uniformity in appearance and most uniformly roasted.

The roasting chambers might be made to open at the side instead of at the ends as shown, and the trays might be differently proportioned to the roasting chamber and might be moved about in the working chamber in a different way from that described.

In fact various modifications in the design of the furnace and in the mode of handling the materials therein may be made by those skilled in the art without departing from the invention.

What I claim is:—

1. A slimes roasting furnace comprising a source of hot gases, means for admitting air thereto, relatively controllable to govern the temperature of the heated gases, a distributing flue receiving the heated gases, a discharge flue, a number of roasting chambers arranged in multiple between such distributing flue and discharge flue, and means for cutting off each of said chambers separately from such flues without interfering with the operation in the other chambers.

2. A slimes roasting furnace comprising a source of hot gases, means for admitting air thereto, relatively controllable to govern the temperature of the heated gases, a distributing flue receiving the heated gases, a discharge flue, a number of roasting chambers arranged in multiple adjacent to one another, each having openings into said distributing flue and discharge flue respectively, and means for shutting said openings for each chamber separately, each chamber having openings separate from those of the other chambers for introducing and withdrawing or inspecting the slimes.

3. A slimes roasting furnace comprising a number of roasting chambers, a single source of heated gases, and controllable means for supplying air to be heated by mixing with said gases after they are heated and before they reach the roasting chambers, whereby a uniform supply of heated air of controllable temperature is afforded, a common exit from said chambers, and means for cutting off each of said chambers separately from the source of heated air and from said exit without interfering with the operation in the other chambers.

4. A slimes roasting furnace comprising a source of hot gases, means for admitting air thereto relatively controllable to govern the temperature of the heated gases, a series of flue-like roasting chambers arranged in multiple for receiving such heated gases, and means for cutting off any chamber independently of the others, said chambers having openings for giving access thereto when thus cut off.

5. A slimes roasting furnace comprising a source of hot gases, means for admitting air thereto relatively controllable to govern the temperature of the heated gases, a series of flue-like roasting chambers arranged in multiple for receiving such heated gases, said chambers having dampered openings at opposite ends whereby any chamber may be separately cut off, and each chamber having openings at opposite ends with closures therefor adapted, when the chamber is cut off, to permit of the insertion and removal of trays carrying the slimes.

6. A slimes roasting furnace comprising a source of hot gases, means for admitting air thereto relatively controllable to govern the temperature of the heated gases, a distributing flue receiving the heated gases, a discharge flue, a series of flue-like roasting chambers arranged in multiple between such receiving and discharge flues, partition plates separating said chambers and constituting the hearths and roofs thereof, said chambers having openings into such flues at opposite ends, and damper plates for closing said openings fitting between said partition plates.

7. A slimes roasting furnace comprising a distributing flue, means for admitting hot gases thereto, a series of roasting chambers arranged in multiple having inlet openings at one end to admit such gases from said distributing flue, and having exit openings at the opposite end, a discharge flue to which said exit openings lead, and said roasting chambers formed between masonry walls inclosing the series of chambers, and metal partition plates separating the individual chambers, with dampers fitting between said plates for controlling said openings.

8. A slimes roasting furnace comprising a series of roasting chambers arranged in multiple, formed by outer walls and horizontal separating partition plates, a single controllable source of heated gases communicating with inlet openings to said chambers, a discharge flue communicating with outlet openings therefrom, and movable dampers for closing said openings whereby any chamber may be isolated at will.

9. A slimes roasting furnace comprising a series of roasting chambers arranged in multiple having outer inclosing walls and intervening horizontal partition plates separating the individual chambers, a source of heated gases communicating with inlet openings at one end of the series of chambers, a discharge flue communicating with outlet openings at the opposite end thereof, dampers for said respective openings, said chambers having at opposite ends openings for admitting and discharging trays carrying the slimes, and removable doors for closing said openings.

10. A slimes roasting furnace comprising a series of roasting chambers arranged in multiple having outer inclosing walls and intervening horizontal partition plates separating the individual chambers, a source of heated gases communicating with inlet openings at one end of the series of chambers, a discharge flue communicating with outlet openings at the opposite end thereof, dampers for said respective openings, said chambers having at opposite ends openings for admitting and discharging trays carrying the slimes, and removable doors for closing said openings, fitting between said partition plates and longer than the width of the openings whereby when in place they may be wedged obliquely into position.

In witness whereof, I have hereunto signed my name in the presence of two subscribing witnesses.

ROWLAND T. WALES.

Witnesses:
D. ANTHONY USINA,
FRED WHITE.